N. J. Willis,
Bed Bottom.

No. 79,285.          Patented June 23, 1868.

Witnesses
S. N. Piper.
Jas. H. Mullen

Inventor
N. J. Willis.
by his attorney
R. H. Eddy

United States Patent Office.

NEWIEL J. WILLIS, OF BOSTON, MASSACHUSETTS, ASSIGNOR TO THE BOSTON SPRING-BED COMPANY, OF THE SAME PLACE.

Letters Patent No. 79,285, dated June 23, 1868.

---

IMPROVED SPRING-BED BOTTOM.

---

*The Schedule referred to in these Letters Patent and making part of the same.*

---

TO ALL PERSONS TO WHOM THESE PRESENTS MAY COME:

Be it known that I, NEWIEL J. WILLIS, of Boston, in the county of Suffolk, and State of Massachusetts, have invented an Improved Spring-Bed Bottom; and I do hereby declare the same to be fully described in the following specification, and represented in the accompanying drawings, of which—

Figure 1:
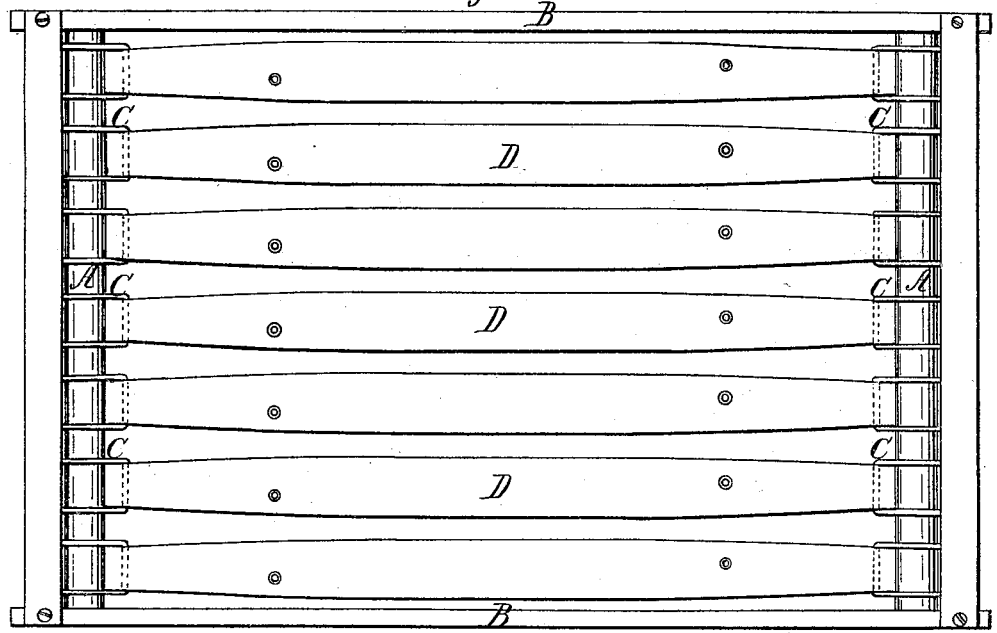

Figure 1 is a top view, and

Figure 2:
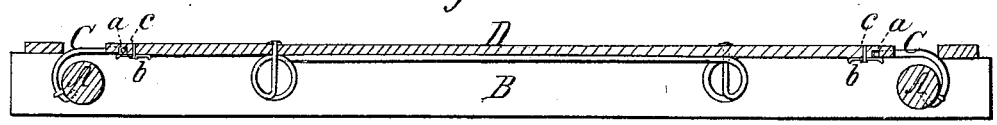

Figure 2 a longitudinal section of the said bed-bottom.

In such drawings, A A are two cylindrical wooden bars, extending transversely across a rectangular frame, B, they being arranged near the ends of such frame. Each of such bars serves to support a series of looped springs, C C C, &c., composed of wires, bent in the form, and arranged with respect to the bars A A, in manner as represented. Resting on these springs is a series of slats, D D D, &c., each of such slats being placed on two of the springs, and provided with two notches or grooves, $a\ a$, extending across it, for reception of the middle straight portions of the two springs.

In further carrying out my invention, I combine with each of the slats, and arrange with respect to it and the two springs, in manner as shown in fig. 2, two turn-buttons, $b\ b$, each of such buttons being held to the slat by a screw or rivet, $c$, so that the button may be revolved on such connection. By turning these buttons across the notches $a\ a$, the slat will be prevented from becoming disengaged from its springs, either by downward pressure or by any sudden elevation of the slat tending to throw it entirely above either spring. By turning the buttons off the springs, the slat may be readily lifted from them. The turn-buttons also serve to keep the slats and their springs in union when the bedstead-frame is turned up on either of its sides or ends. Each spring, by being fastened at or near its extremities to the round bar A, will, while being depressed, be supported by the bar on which the spring will wind. This winding of the spring on the bar adjusts the spring to the force tending to depress it, and as the spring will rest upon the bar, the latter will operate to prevent breakage of the spring.

In my invention or spring-bed bottom, as described in the United States patent, dated February 27, 1866, and numbered 52,937, I make use of a strap to each spring, such strap going along the upper surface thereof. This strap is an inconvenient application of the slat to the spring, and is liable to several objections which my present invention completely obviates.

I claim the improved spring-bed bottom, as composed of the frame B, the two round bars A, the two series of springs C, (of the kind described,) and the series of slats D, arranged and applied together substantially as described.

I also claim the construction and arrangement of the two buttons with the grooved slats and their springs, arranged and applied to such slats and round bars in manner substantially as explained.

N. J. WILLIS.

Witnesses:
R. H. EDDY,
F. P. HALE, Jr.